United States Patent [19]
Popp

[11] Patent Number: 5,170,606
[45] Date of Patent: Dec. 15, 1992

[54] ANCHOR SLEEVE

[75] Inventor: Franz Popp, Buchloe, Fed. Rep. of Germany

[73] Assignee: Hilti Aktiengesellschaft, Furstentum, Liechtenstein

[21] Appl. No.: 660,446

[22] Filed: Feb. 22, 1991

[30] Foreign Application Priority Data

Feb. 26, 1990 [DE] Fed. Rep. of Germany ....... 4005998

[51] Int. Cl.$^5$ .............................................. E04C 1/38
[52] U.S. Cl. ...................................... 52/707; 52/710; 411/72; 411/82; 411/452
[58] Field of Search .............. 52/705, 706, 707, 704, 52/710; 411/71, 72, 73, 82, 178, 15, 55, 452, 453

[56] References Cited

U.S. PATENT DOCUMENTS

| | | | |
|---|---|---|---|
| 575,282 | 1/1897 | Cook | 411/71 X |
| 3,181,414 | 5/1965 | Dickow | 411/72 X |
| 4,363,581 | 12/1982 | Pense | 411/82 |
| 4,631,889 | 12/1986 | Adam et al. | 52/704 X |
| 4,666,345 | 5/1987 | Seegmiller | 411/452 X |
| 4,712,957 | 12/1987 | Edwards et al. | 411/82 |
| 4,846,655 | 7/1989 | Gulley | 411/453 |
| 4,968,185 | 11/1990 | Leibhard et al. | 52/704 X |
| 5,064,323 | 11/1991 | Barnsdale | 411/178 |

FOREIGN PATENT DOCUMENTS

| | | | |
|---|---|---|---|
| 1784010 | 6/1972 | Fed. Rep. of Germany | 411/73 |
| 2255598 | 5/1974 | Fed. Rep. of Germany | 411/74 |
| 2440705 | 3/1975 | Fed. Rep. of Germany | 411/178 |
| 2434713 | 2/1976 | Fed. Rep. of Germany | 411/73 |

Primary Examiner—David A. Scherbel
Assistant Examiner—Kien Nguyen
Attorney, Agent, or Firm—Anderson Kill Olick & Oshinsky

[57] ABSTRACT

An axially extending sleeve (1), for use as an anchor secured by grout or a hardenable mass in a blind bore (2a) in a structural component (2), has an outside surface with a radially outwardly projection extending in the axial direction of the sleeve. The sleeve has a closed first end leading in the insertion direction and a trailing second end. The projection extends from the second end in the axial direction toward the first end. An elastic layer (3) is placed over the surface of the structural component containing the bore and a hole (3a) in the elastic layer is aligned with the bore in the component. When the sleeve (1) is inserted into the bore (2a), the projection (1d) forms a passageway through the elastic layer, so that air and excess grout can escape from the bore through the elastic layer.

5 Claims, 2 Drawing Sheets

ANCHOR SLEEVE

BACKGROUND OF THE INVENTION

The present invention is directed to an anchor sleeve to be secured by grout or a hardenable mass within a bore in a structural component. The leading end of the sleeve is closed, that is the end first inserted into the bore.

To provide an anchor in a structural component for receiving an attachment bolt or the like, it is known to fill a prefabricated bore with grout or a hardenable mass and then to insert a sleeve into the bore with the sleeve having an internal thread for securing the attachment or fastening bolt. The grout or hardenable mass forms an adhesive connection between the sleeve and the bore in the component. Such an adhesive connection or bonding can only be adequately achieved, if the grout or hardenable mass can distribute itself uniformly along the axial length of the bore. One requirement for uniform distribution of the grout is an unimpeded escape of air pockets from the bore, accordingly, it is necessary that the bore is open at the surface of the component so that all air within the bore can escape along with any excess grout.

If the above method is applied to the attachment of railroad rails, difficulties occur if an elastic overlay, such as a rubber mat, must be introduced between the rail and the structural component or tie. The rubber mat is required for dampening. Such a rubber mat embraces the sleeve because of its elasticity and, as a result, forms a seal at the bore opening in the component or tie. The escape of air and possibly excess grout is blocked, whereby a uniform distribution of the grout and an adequate adhesive connection can not be assured.

SUMMARY OF THE INVENTION

Therefore, the primary object of the present invention is to provide an anchor sleeve of the type described above, so that, independently of the condition of the bore, an escape of air and excess grout from the bore is possible.

In accordance with the present invention, a projection extends radially outwardly from the outside surface of the sleeve and extends from the trailing end of the sleeve toward the leading end for at least a part of the axial length of the sleeve.

The projection supports the sleeve against the wall of the bore so that an adequate free space is provided between the outside surface of the sleeve and the wall of the bore to enable an unimpeded displacement of air and possibly excess grout out of the bore. If the sleeve extends through a hole in the rubber mat forming an overlay on the structural component or tie, then the hole in the rubber mat is enlarged by the projection whereby the hole in the mat adjacent the projection does not have a circular shape and forms gaps between the hole and the outside surface of the sleeve adjacent the projection. Air pockets and excess grout can flow through these gaps when the sleeve is introduced into the bore.

Preferably, the projection extends along the full axial length of the sleeve. Accordingly, an adequate free space is created along the full insertion length of the sleeve.

In a preferred arrangement the projection is formed by two ribs extending in the axial direction of the sleeve with the ribs spaced from one another in the circumferential direction. With the ribs spaced apart in the circumferential direction for approximately the height of one rib, an axially extending channel between the ribs forms an open space.

For at least a part of the axial length of the projection its radial dimension decreases continuously between the ends toward the leading end of the sleeve to facilitate its introduction into the bore. Accordingly, the projection forms an inclined ramp with the radial dimension of the ramp at the leading end being zero.

Preferably, the sleeve is utilized so that its trailing end having the full radial dimension of the projection extends through the elastic mat or overlay placed on the structural component. The elastic overlay is widened in the region of the projection, so that an adequate open space is formed for the escape of air from the bore and possibly for the outflow of excess grout.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
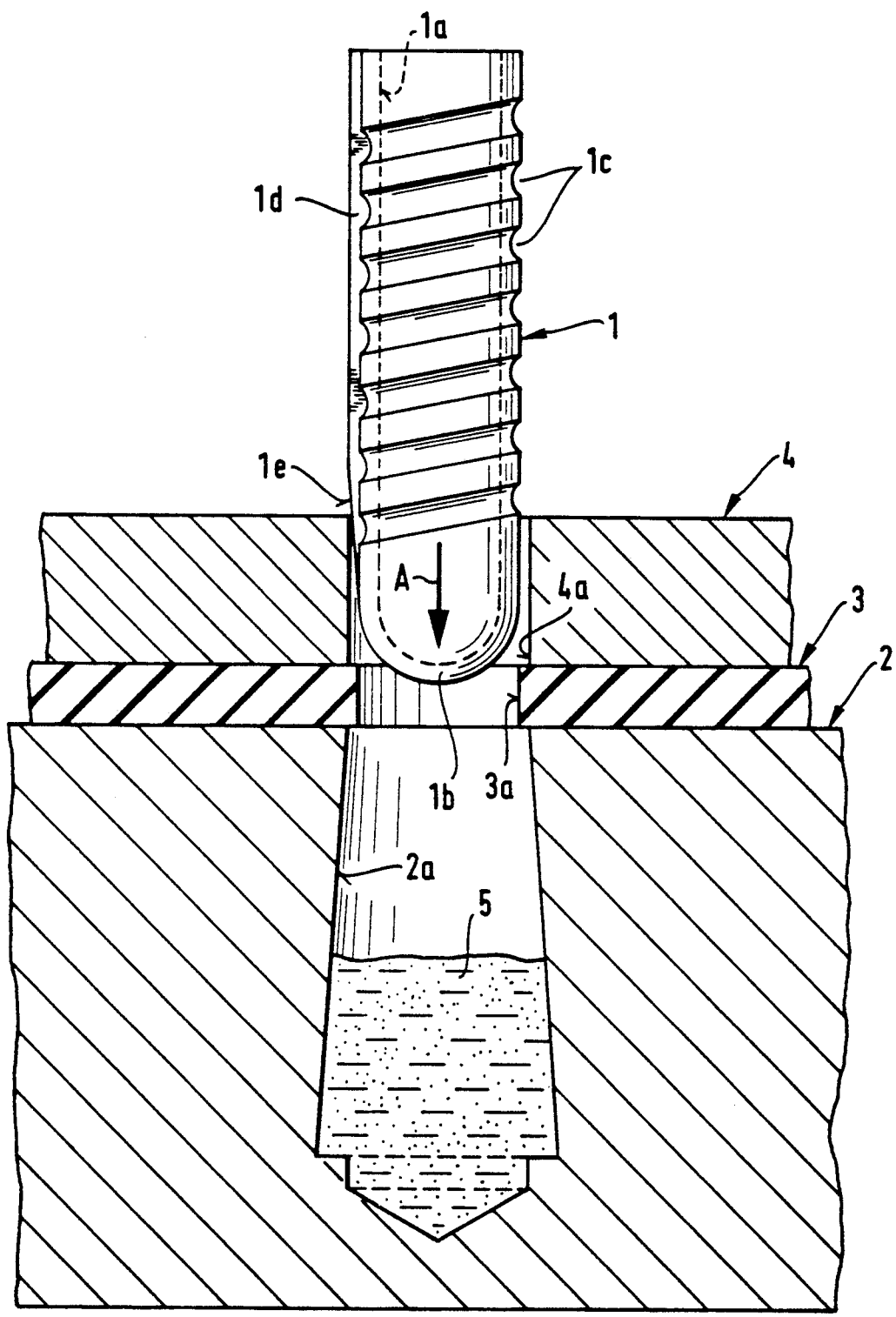
FIG. 1 is an axially extending section through an anchoring arrangement at the commencement of insertion of the sleeve embodying the present invention.

In FIG. 1 a sleeve 1 is intended to serve as an anchor in a structural component 2, such as a railroad tie in the illustrated case. A rubber mat 3 is placed over the upper surface of the component 2. In turn, a steel plate 4 is supported on the rubber mat 3. The steel plate 4 serves as a connecting element for bolting a railroad rail to it, the rail is not shown.

A blind bore 2a is provided in the component for receiving the sleeve. As shown, the bore widens from the opening into the bore to the base. In FIG. 1 the bore 2a is partially filled with grout or a hardenable mass 5. A hole 4a is formed in the steel plate 4 and another hole 3a is formed through the rubber mat 3 with the two holes being co-axial with the bore 2a. The hole 3a in the rubber mat 3 has a diameter not larger than the diameter of the outside circular surface of the sleeve 1.

Figure 3:
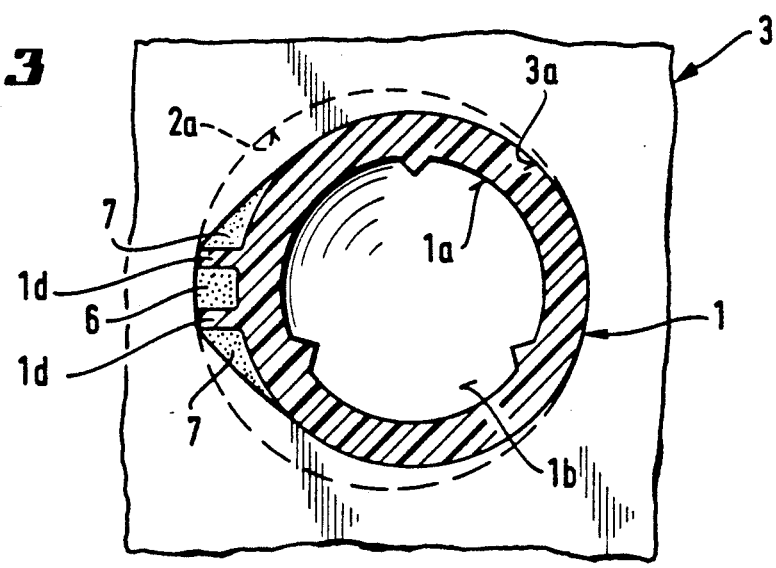
FIG. 3 is an enlarged sectional view taken along the line III—III in FIG. 2.

Sleeve 1 has a central bore 1a extending from its trailing or upper end as viewed in FIG. 1 to base 1b of the sleeve. The base 1b is closed by the rounded leading end of the sleeve. Central bore 1a is arranged to receive a bolt for fastening the steel plate 4 to the component or tie 2. The outside surface of the sleeve 1 is provided with circumferentially extending grooves 1c. A radially extending projection 1d, in the form of two ribs 1d, note FIG. 3, extends from the trailing end of the sleeve 1 in the axial direction to the base 1b. In the setting or insertion direction of the sleeve the projection 1d extends continuously and is formed at least in part as an inclined ramp tapering inwardly to the leading end or base 1b of the sleeve.

Figure 2:
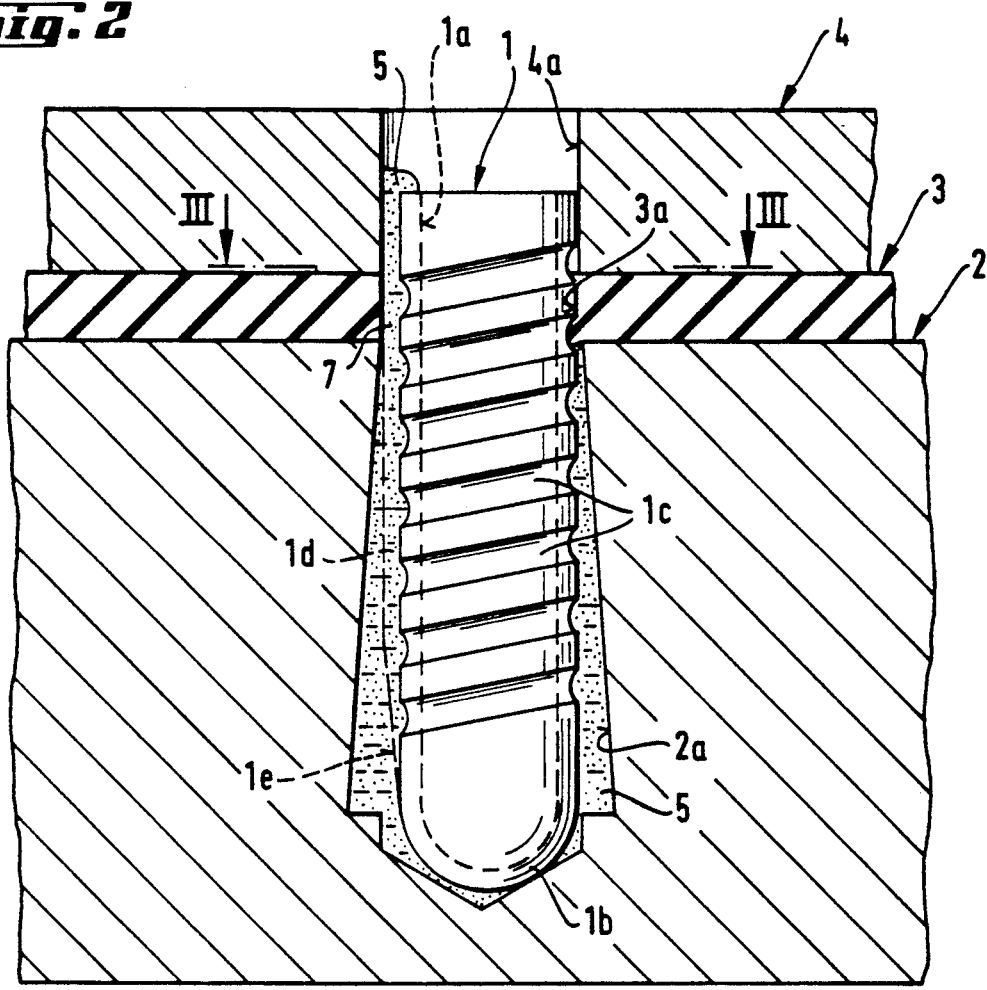
FIG. 2 is a sectional view similar to FIG. 1, however, with the sleeve fully inserted.

When the sleeve is inserted in the setting direction, as indicated by the arrow A in FIG. 1, the sleeve passes through the holes 4a, 3a in the steel plate 4 and the mat 3, respectively, into the bore 2a. Note the fully inserted sleeve 1 as shown in FIG. 2. As it is inserted, the sleeve 1 displaces a portion of the grout 5 out of the bore 2a opposite to the setting direction A. Since the projection 1d extends radially outwardly from the outside surface of the sleeve 1, with the hole 3a in the elastic mat 3 being the same as the diameter of the outside surface of the sleeve, the projection presses the mat radially outwardly. The channel 6 formed between the ribs 1d forms an open passageway for the flow of air out of the bore 2a. Since the ribs 1d press the elastic rubber mat 3 radially outwardly relative to the axis of the borehole 2a, the channel is open in the region of the rubber mat. In addition, two generally triangularly shaped gaps or slots 7 are formed, one on each of the opposite sides of the projection 1d, between the surface of the hole 3a in the mat and the outside surface of the sleeve 1. As a result, air and the grout 5 can escape from the bore 2a through the slots 7.

As can be seen in FIG. 2 the combination of the radial dimension of the projection 1d at the trailing end of the sleeve 1 and the diameter of the outside surface of the sleeve 1 equal the diameter of the hole 4a through the plate 4.

While specific embodiments of the invention have been shown and described in detail to illustrate the application of the inventive principles, it will be understood that the invention may be embodied otherwise without departing from such principles.

I claim:

1. An axially extending sleeve (1) for use as an anchor secured by grout or a hardenable mass (5) in a bore (2a) in a structural component (2), said sleeve having a closed first end (1b) leading in an insertion direction for placing the sleeve in the bore and a second end, wherein the improvement comprises that said sleeve (1) has a circumferentially and axially extending outside surface imperforate between the first and second ends thereof, said sleeve forms a central bore (1a) extending from the second end toward the first end for receiving and holding a bolt therein, a projection (1d) formed by a pair of laterally spaced ribs extending approximately radially outwardly from the outside surface and extending in the axial direction of the said sleeve from said second end for at least a part of the axial extent of said sleeve to adjacent the first end thereof, said ribs being spaced apart in the circumferential direction by a dimension approximately equal to a radial dimension of one rib adjacent the second end of said sleeve, and said ribs form an open channel (6) therebetween.

2. An axially extending sleeve (1), as set forth in claim 1, wherein said projection (1d) extends for approximately the full axial extent of said sleeve (1).

3. An axially extending sleeve (1), as set forth in claims 1 or 2, wherein the radial dimension of the projection (1d) decreases towards the first end (1b) of said sleeve in the axial direction for a part thereof between the second and first ends.

4. An axially extending sleeve (1), as set forth in claim 1, wherein said projection forms an inclined ramp projecting radially outwardly from the outside surface of said sleeve adjacent the first end (1b) thereof for at least an axially extending part of said sleeve, and the closed first end (1b) of said sleeve has a rounded configuration.

5. An axially extending sleeve (1), as set forth in claim 1, wherein the outside surface of said sleeve is circularly shaped with said projection (1d) extending radially outwardly from said circularly shaped outside surface and said outside surface has spaced circumferentially extending grooves.

* * * * *